United States Patent [19]

Maemine

[11] Patent Number: 4,701,650
[45] Date of Patent: Oct. 20, 1987

[54] BRUSHLESS MOTOR WITH PHASE CANCELLING LEADS FOR ROTATIONAL SPEED DETECTOR PATTERN

[75] Inventor: Kenji Maemine, Kakuda, Japan
[73] Assignee: Alps Electric Co., Ltd., Japan
[21] Appl. No.: 892,956
[22] Filed: Aug. 4, 1986
[30] Foreign Application Priority Data
   Aug. 2, 1986 [JP] Japan .................. 60-119511[U]
[51] Int. Cl.⁴ .................................... H02K 21/24
[52] U.S. Cl. ................... 310/68 R; 310/171; 310/268; 310/DIG. 6
[58] Field of Search .......... 29/596; 310/71, 171, 310/268, DIG. 6, 207, 68 R, 68 B, 156; 339/17 F

[56] References Cited

U.S. PATENT DOCUMENTS

| | | | |
|---|---|---|---|
| 4,093,897 | 6/1978 | Fujita et al. | 310/268 |
| 4,260,920 | 4/1981 | Nakamura et al. | 310/156 |
| 4,394,594 | 7/1983 | Schmider | 310/268 |

Primary Examiner—Patrick R. Salce
Assistant Examiner—D. L. Rebsch
Attorney, Agent, or Firm—Guy W. Shoup

[57] ABSTRACT

In a brushless motor, a rotor magnet is rotatably supported and comprises a main magnetizing member for rotation driving with N-poles and S-poles alternately arranged, and a subsidiary magnetizing member for detecting the rotatonal speed with N-poles and S-poles alternately arranged at smaller pitch than that of the main magnetizing member. A stationary plate is provided with stator coils opposed to the main magnetizing member for rotation driving and a detecting substrate having a pattern in opposition to the subsidiary magnetizing member. A pair of leads connected to the pattern of the detecting substrate are arranged at the same angle as the angular interval of two consecutive magnetic poles with the same polarity in the main magnetizing member for rotation driving or at an angle corresponding to an integer multiple of the angular interval. This results in phase cancellation of distorting signals from the driving poles.

1 Claim, 9 Drawing Figures

BRUSHLESS MOTOR WITH PHASE CANCELLING LEADS FOR ROTATIONAL SPEED DETECTOR PATTERN

BACKGROUND OF THE INVENTION

1. Field of the Invention

The present invention relates to a brushless motor which is installed to a drive member of a compact disc player, a tape player or the like.

2. Description of the Prior Art

FIG. 3 is a sectional view of a brushless motor in the prior art.

Numeral 1 designates a rotary shaft. The rotary shaft 1 is rotatably supported by a thrust bearing 2 and a radial bearing 3. A rotor yoke 4 is fixed to the rotary shaft 1, and a ring-shaped rotor magnet 5 is fixed to a lower surface of the rotor yoke 4. A coil substrate 7 is fixed on the stationary plate 6. The coil substrate 7 is a flexible substrate. A plurality of stator coils 8 are fixed on an upper surface of the coil substrate 7. The stator coils 8 are wound in nearly square form and arranged at regular intervals as shown in FIG. 4. A lead plate 7a extends integrally from edge portion of the coil substrate 7. A lead pattern (not shown) is formed on the lead plate 7a, and current is supplied to each stator coil 8 through the lead pattern. A detecting substrate 9 is fixed on the stator coils 8. The detecting substrate 9 is also a flexible substrate. The detecting substrate 9 is provided with a pattern 10 for detecting the rotational speed as shown in FIG. 5. A lead plate 9a is installed integrally to a side edge portion of the detecting substrate 9, and lead patterns 10a are formed on the lead plate 9a. The signal from the pattern 10 for detecting the rotational speed is taken out by the lead patterns 10a.

As shown in FIG. 6, the rotor magnet 5 comprises a main magnetizing member 5a for rotation driving formed on the outer circumferential portion of the rotor, and an FG magnetizing member 5b for detecting the rotational speed formed on the inner diameter side of the rotor. In the main magnetizing member 5a, N-poles and S-poles are alternately arranged in the circumferential direction and magnetized. The stator coil 8 is constituted so that current flows in the radial direction at linear parts 8a and 8b. Electromagnetic force in the rotational direction acts on the rotor magnet 5 according to the current flowing through the linear parts 8a and 8b and the polarity of the main magnetizing member 5a opposed to the current.

In the FG magnetizing member 5b of the rotor magnet 5, N-poles and S-poles are alternately formed in the circumferential direction at shorter pitch than that of the main magnetizing member 5a. On the other hand, the detecting pattern 10 as shown in FIG. 5 comprises detecting parts 10b arranged at short pitch so that current flows in the radial direction. The pattern 10 for detecting the rotational speed is opposed to the FG magnetizing member 5b as shown in FIG. 7. If the rotor magnet 5 is rotated, pulses are outputted from the pattern 10 for detecting the rotational speed corresponding to the magnetic poles of the FG magnetizing member 5b. The rotational speed of the rotor magnet 5 is detected according to the pulse output.

In the brushless motor in the prior art, the detecting substrate 9 is formed as shown in FIG. 5, and the lead patterns 10a connected to the pattern 10 for detecting the rotational speed extend in parallel to each other at a small spacing. Furthermore, the lead patterns 10a cross the main magnetizing member 5a of the rotor magnet 5 and extend outward as shown in FIG. 7. Consequently, if the rotor magnet 5 is driven to rotate, the main magnetizing member 5a is moved across the lead patterns 10a so that electromotive force is produced in the lead patterns 10a by means of the magnetic force of the main magnetizing member 5a. When the two lead patterns 10a are disposed on magnetic poles of the same polarity, e.g., N-poles of the main magnetizing member 5a, the electromotive force in the same direction acts on the two lead patterns 10a (refer to α in FIG. 7). In this case, the electromotive force in the two lead patterns 10a is canceled, and current does not flow in the lead patterns 10a. On the contrary, as shown in FIG. 7, when the two lead patterns 10a ride on the border of the N-pole and the S-pole, the electromotive force in different directions is generated in the two lead patterns 10a as shown in β of FIG. 7. Since the lead patterns 10a are connected to both ends of the pattern 10 for detecting the rotational speed in series to each other, unwanted current flows through the pattern 10 for detecting the rotational speed and the lead patterns 10a by means of the electromotive force shown in β. If the unwanted current is produced, as shown in FIG. 8, regular distortion is produced in the rotational speed detecting pulses P outputted from the lead patterns 10a.

SUMMARY OF THE INVENTION

In view of the above-mentioned disadvantages in the prior art, an object of the invention is to provide a brushless motor wherein the electromotive force generated to each of a pair of leads extending from a rotational speed detecting pattern across a main magnetizing member for rotation driving of a rotor magnet can be always canceled, and the pulse output for detecting the rotational speed does not include distortion, whereby the detecting accuracy is improved.

The invention consists in a brushless motor, wherein a rotor magnet is rotatably supported and comprises a main magnetizing member for rotation driving with N-poles and S-poles alternately arranged in the rotational direction and a secondary magnetizing member for detecting the rotational speed with N-poles and S-poles alternately arranged at smaller pitch than that of the main magnetizing member for rotation driving, a stationary plate is provided with stator coils opposed to the main magnetizing member so that current flows in the radial direction of the rotor magnet and a detecting substrate having a pattern in opposition to the secondary magnetizing member for detecting the rotational speed, and a pair of leads connected to the pattern of the detecting substrate extend outward across the main magnetizing member, characterized in that each pair of leads connected to the pattern of the detecting substrate are arranged at the same angle as the angular interval of two consecutive magnetic poles with the same polarity in the main magnetizing member for rotation driving or at an angle corresponding to an integer multiple of the arranging angle.

In the invention, since a pair of leads connected to the rotational speed detecting pattern of the detecting substrate are always opposed to two magnetic poles with the same polarity of the magnetizing member for rotation driving, electromotive force generated in each lead is canceled, thus eliminating unwanted current in the pulse signal provided from the leads for detecting the rotational speed of the rotor.

DESCRIPTION OF THE PREFERRED EMBODIMENT

An embodiment of the invention will now be described referring to FIGS. 1 and 2.

Figure 1:
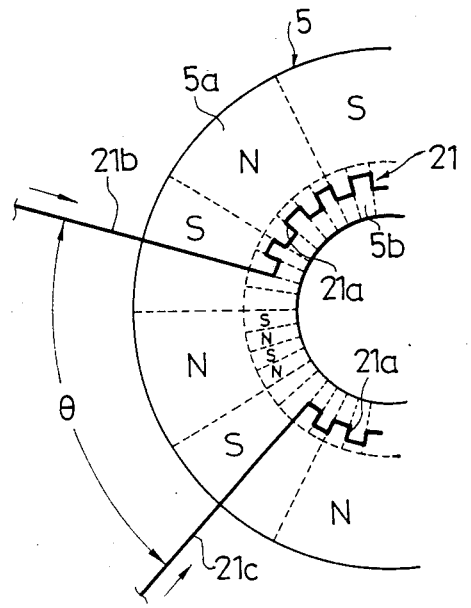
FIG. 1 is a fragmentary plan view of a brushless motor according to the invention illustrating a rotational speed detecting pattern and a rotor magnet.
Figure 2:
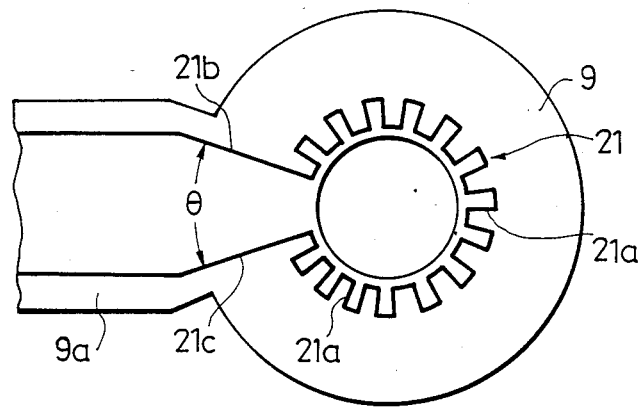
FIG. 2 is a plan view of a detecting substrate according to the invention.

FIG. 1 is a fragmentary plan view of a brushless motor according to the invention illustrating a rotational speed detecting pattern and a rotor magnet, and FIG. 2 is a plan view of a detecting substrate.

Figure 3:
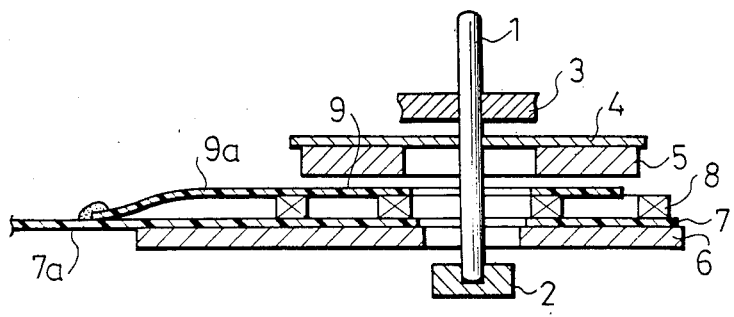
FIG. 3 is a sectional view illustrating the structure of the brushless motor.
Figure 4:
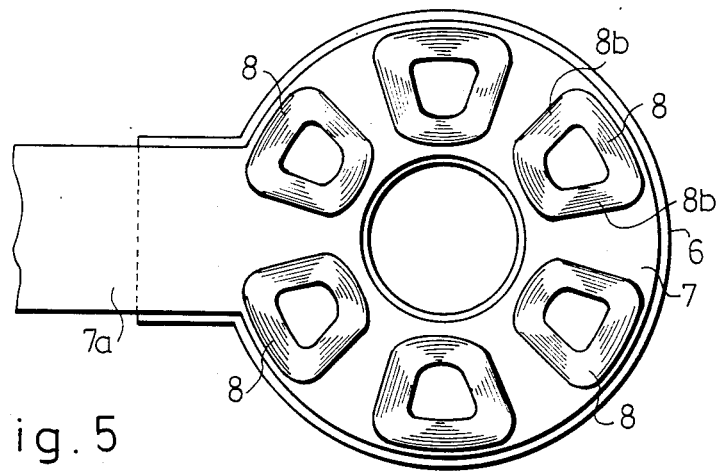
FIG. 4 is a plan view of the brushless motor illustrating a coil mounting part.
Figure 5:
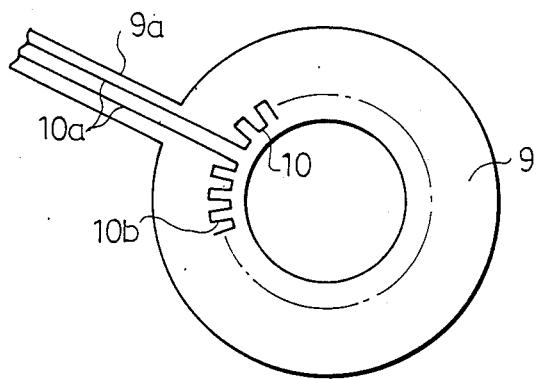
FIG. 5 is a plan view of a detecting substrate in the prior art.
Figure 6:
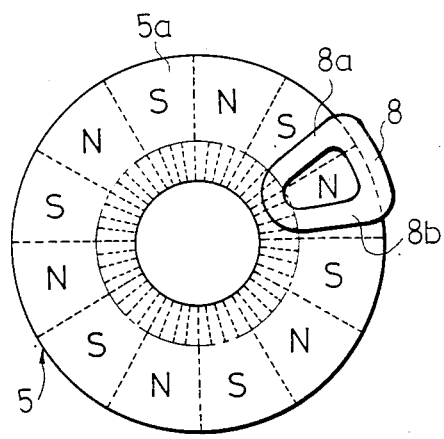
FIG. 6 is a plan view of a rotor magnet.
Figure 7:
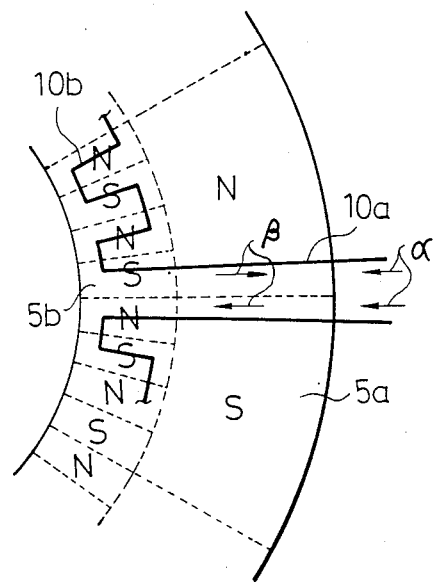
FIG. 7 is an enlarged plan view illustrating the rotor magnet and a rotational speed detecting pattern in the prior art.

The brushless motor of the invention is similar to that of the prior art in the basic structure as shown in FIG. 3. That is, a rotary shaft 1 is rotatably supported by a thrust bearing 2 and a radial bearing 3, and a rotor yoke 4 and a rotor magnet 5 are fixed to the rotary shaft 1. A coil substrate 7 is fixed on a stationary plate 6, and a plurality of stator coils 8 are fixed on an upper surface of the coil substrate 7. A detecting substrate 9 is installed on the stator coils 8. As shown in FIG. 6, the rotor magnet 5 comprises a main magnetizing member 5a for rotational driving at the outer circumferential portion of the rotor and an FG magnetizing member 5b for detecting the rotational speed at the inner diameter side of the rotor. In the main magnetizing member 5a, N-poles and S-poles are alternately arranged in the circumferential direction and magnetized. The stator coils 8 are opposed to the main magnetizing member 5a. In the FG magnetizing member 5b of rotor magnet 5, N-poles and S-poles are alternately magnetized in the circumferential direction at a shorter pitch than that of the main magnetizing member 5a.

The detecting substrate 9 is made of a flexible substrate in a ring shape as shown in FIG. 2. A lead plate 9a extends in a band shape from the lateral side of the detecting substrate 9 and is formed integrally as described above. The lead plate 9a crosses the main magnetizing member 5a of the rotor magnet 5 and extends outward. A rotational speed detecting pattern 21 is formed on the center of the detecting substrate 9 by means of printing or the like. The pattern 21 has detecting parts 21a extending in radial directions, and connecting parts extend on alternate sides in the circumferential direction. The detecting parts 21a are arranged at the same spacing as the arranging pitch of each magnetic pole in the FG magnetizing member 5b of the rotor magnet 5.

Lead patterns 21b and 21c are connected to both ends of the pattern 21. The lead patterns 21b and 21c extend from the center of the detecting substrate 9 at a prescribed arranging angle $\theta$, and further extend in parallel along the lead plate 9a and are connected to a connector (not shown) at an portion of the lead plate 9a. The opening angle $\theta$ of the lead patterns 21b and 21c is specified to be the same angle as the arranging angle between two consecutive magnetic poles of the same polarity (between N-poles or between S-poles) in the magnetizing member 5a for rotation driving of the rotor magnet 5 or to an angle corresponding to an integer multiple of the arranging angle of the poles of the same polarity. That is, if the magnetizing member 5a for rotation driving of the rotor magnet 5 has N-poles and S-poles of A in number of the same polarity, the opening angle $\theta$ of the lead patterns 21b and 21c becomes $$\theta = (360° \div A) \times n$$

(wherein n: integer)

For example, if A=5 (five N-poles and five S-poles), it follows that $\theta = 72°$ or $\theta = 144°$.

If the opening angle $\theta$ of the lead patterns 21b and 21c is set as above described, the lead patterns 21b and 21c cross the magnetic poles of the same polarity (both N-poles or both S-poles) spaced apart at the same angular interval.

Operation of the brushless motor will be described.

Current flows through each coil 8 in clockwise and counterclockwise directions alternately. More specifically, a Hall element or the like detects the polarity of the main magnetizing member 5a of the rotor magnet 5 positioned thereon, and current flows through each coil 8 in clockwise and counterclockwise directions corresponding to the detection of the polarity. Electromagnetic force in the rotational direction is produced by current flowing through the linear parts 8a and 8b of the coil 8 and the magnetic field generated by the magnetizing member 5a of the rotor magnet 5, and the rotor magnet 5 and the yoke 4 and the rotary shaft 1 are driven to rotate.

Figure 9:
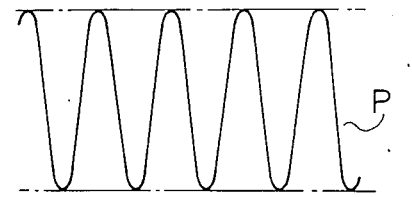
FIG. 9 is a diagram illustrating rotational speed detecting pulses of the brushless motor according to the invention.

In the rotational speed detecting pattern 21 on the detecting substrate 23, current flows corresponding to the polarity of the passing poles of the FG magnetizing member 5b and the rotational speed detecting pulses P shown in FIG. 9 are outputted. The output is transmitted from the lead patterns 21a and 21b and taken to the external circuit. The rotational speed of the motor is detected by counting the output pulses. In a compact disc player or the like, current flowing through the coil 8 is controlled corresponding to the detected rotational speed, thereby the rotational speed of the disc drive member is controlled.

Figure 8:
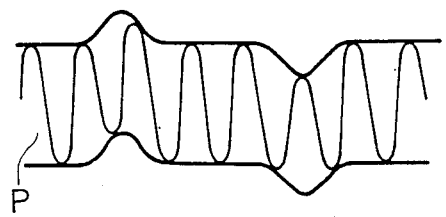
FIG. 8 is a diagram illustrating rotational speed detecting pulses of the brushless motor in the prior art.

While the rotor magnet 5 is rotated, the main magnetizing member 5a passes opposing to the lead patterns 21b and 21c. Moving of each magnetic pole of the main magnetizing member 5a generates electromotive force on the lead patterns 21b and 21c. The lead patterns 21b and 21c are located at each instant opposite magnetic poles of the same polarity in the main magnetizing member 5a as above described. That is, while one lead pattern 21b crosses an N-pole, the other pattern 21c also crosses an N-pole surely. Consequently, electromotive force generated in each of the lead patterns 21b and 21c by the main magnetizing member 5a has the same direction, for example, each has the direction towards the center of the detecting substrate 5 or the direction towards the outside. Since the lead patterns 21*b*, 21*c* and the rotational speed detecting pattern 21 are connected in series, the electromotive force generated in each of the lead patterns 21*b* and 21*c* is canceled, thereby unwanted current does not flow, and distortion of output pulses as shown in FIG. 8 can be eliminated. As illustrated in FIG. 9, pulse signals indicating rotational speed are obtained without any periodic distortion. When one lead pattern 21*b* is positioned at the border of two poles of the main magnetizing member 5*a*, the other lead pattern 21*c* is also positioned at the border between two poles whereby electromotive force in the lead patterns 21*b*, 21*c* is not generated. Since passing of the main magnetizing member 5*a* does not produce unwanted current in the lead patterns 21*b* and 21*c* as above described, the flat output pulses as shown in FIG. 9 can be always obtained.

According to the invention as above described, since the leads of the rotational speed detecting pattern are not affected by the magnetic poles of the rotor magnet, the rotational speed detecting pulses can be taken out without including unwanted components. Thus the rotational speed can be controlled at high accuracy. Furthermore, since the leads of the detecting substrate are positioned so as to cross the poles of the main magnetizing member at a specified angle, no complicated structure is required to correct distortion.

What is claimed is:

1. A brushless motor comprising:
   a rotatably supported rotor having a rotor magnet provided with a main magnetizing member located at a radially outward part of the rotor and composed of magnetic N-poles and S-poles alternately arranged at angular intervals in a circumferential direction, and a subsidiary magnetizing member located at a radially inward part of the rotor and composed of magnetic N-poles and S-poles alternately arranged at a smaller angular pitch than those of the main magnetizing member;
   a stationary plate facing opposite in parallel with said rotor having stator coils located opposite said magnetic poles of said main magnetizing member for driving the rotor in rotation when current is provided to said stator coils, and a substrate with a conductive pattern thereon located opposite said magnetic poles of said subsidiary magnetizing member in which a current signal indicating the rotational speed of the rotor is generated; and
   a pair of leads connected to the conductive pattern on the substrate which extend radially outward across a part of the stationary plate opposite said magnetic poles of said main magnetizing member,
   wherein said pair of leads are arranged spaced apart at an angle equal to the angular interval between two consecutive magnetic poles of the same polarity of said main magnetizing member or to an integer multiple of said angular interval.

* * * * *